United States Patent [19]

Clarkson et al.

[11] Patent Number: 4,688,597

[45] Date of Patent: Aug. 25, 1987

[54] GATE VALVE

[75] Inventors: Curtis W. Clarkson; Larry F. Koll, both of Reno, Nev.

[73] Assignee: The Clarkson Company, Sparks, Nev.

[21] Appl. No.: 899,427

[22] Filed: Aug. 22, 1986

[51] Int. Cl.[4] ............................................. F16L 7/00
[52] U.S. Cl. .................... 137/375; 251/195; 251/327; 251/328; 138/94.3
[58] Field of Search ............... 137/375; 251/170, 195, 251/326, 327, 328; 138/94.3

[56] References Cited

U.S. PATENT DOCUMENTS

| | | | |
|---|---|---|---|
| 3,000,608 | 9/1961 | Williams | 251/170 |
| 3,904,173 | 9/1975 | Naylor | 137/375 |
| 4,051,863 | 10/1977 | Still | 251/328 |
| 4,257,447 | 3/1981 | Clarkson | 137/375 |
| 4,259,980 | 4/1981 | Müller | 137/375 |
| 4,491,144 | 1/1985 | Dreyer et al. | 138/94.3 |

*Primary Examiner*—A. Michael Chambers
*Attorney, Agent, or Firm*—Nies, Webner, Kurz & Bergert

[57] ABSTRACT

A packingless gate valve is disclosed which includes a housing having opposed similar housing halves with resilient sleeve units which compressibly engage each other in the valve open condition and engage opposite sides of the gate in the valve closed condition. Each sleeve unit has a flange on the inner and outer axial ends, with the flanges extending radially outwardly from the sleeve body. An encircling thin stiffening ring of harder material is bonded to the axially outer surface of the flange on the inner end of each sleeve, each stiffening ring being shaped with a right angle bend so as to provide both axially and radially facing surfaces for each sleeve body. The particular configuration and position of the stiffener rings has been found to function advantageously in preventing the pliable sleeve material from following the gate as it penetrates between the opposed sleeve units. The axially extending portion of the stiffener rings also assists in aligning the opposed sleeves with the housing as well as with each other. The gate valve construction of the present invention results in no leakage to the outside when the valve is fully open and no leakage to the outside or past the gate internally when the valve is fully closed.

10 Claims, 8 Drawing Figures

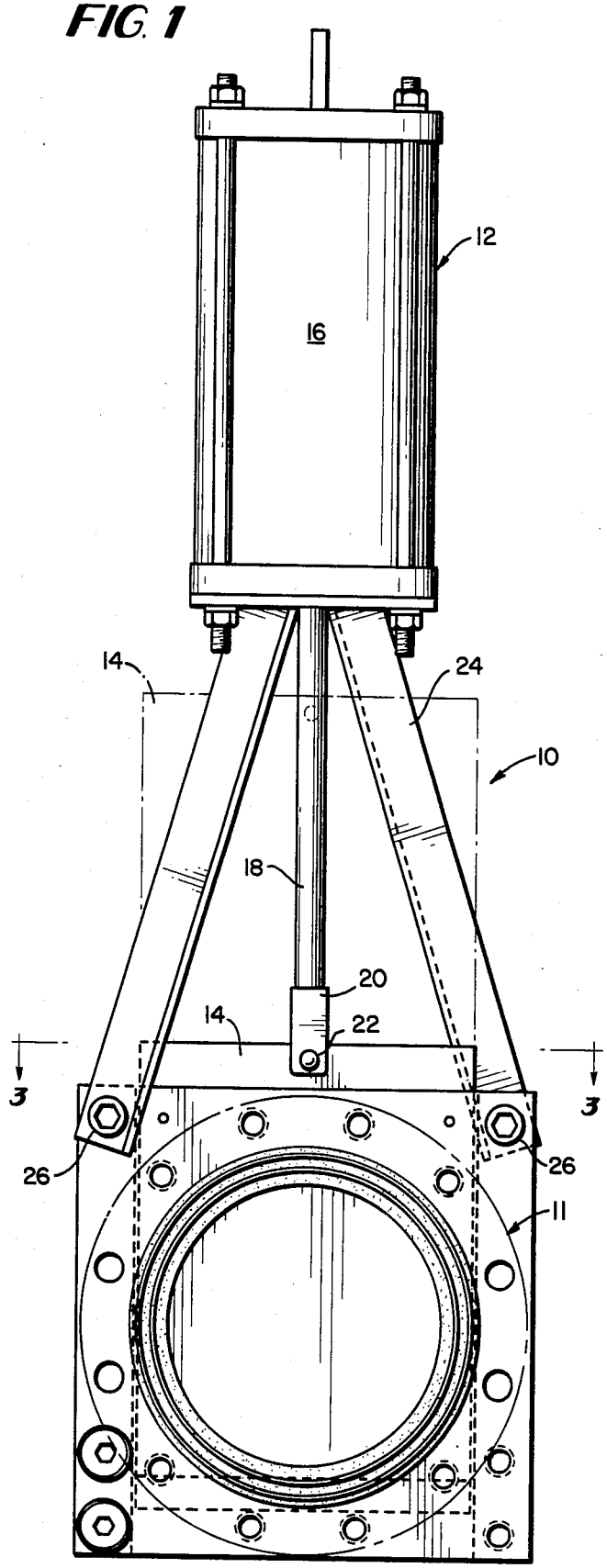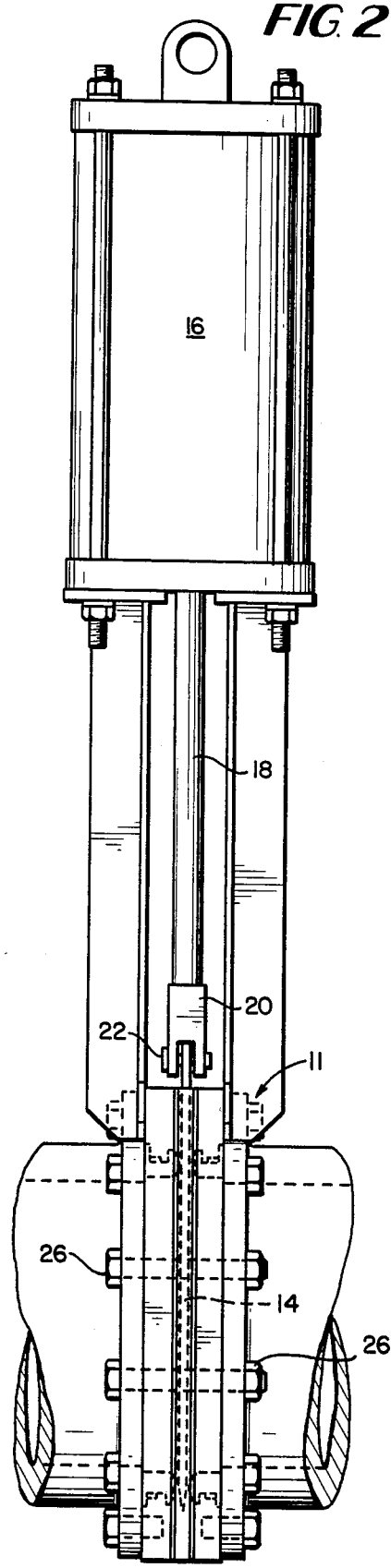

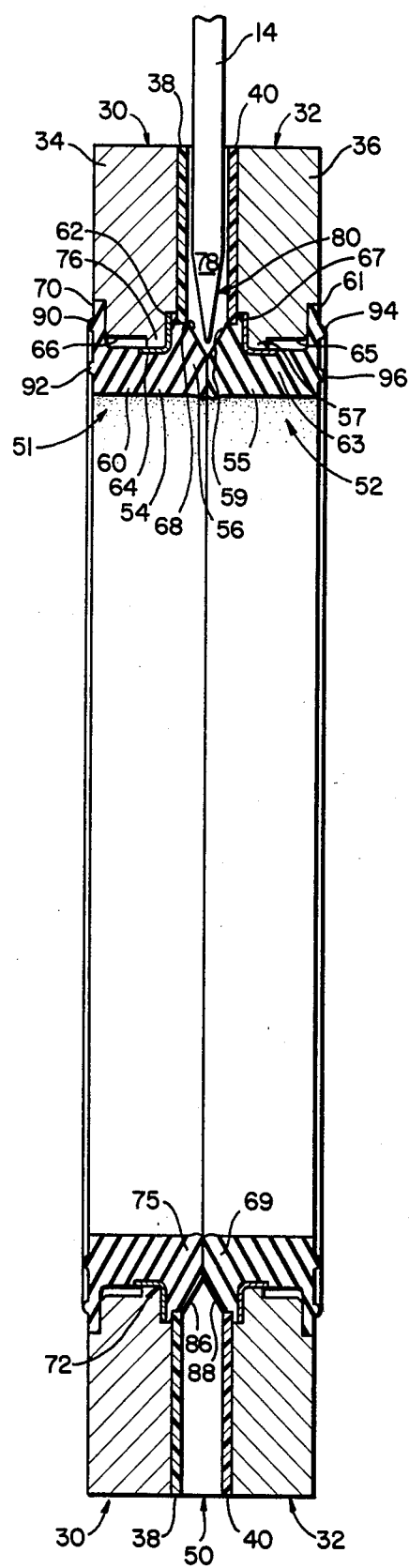
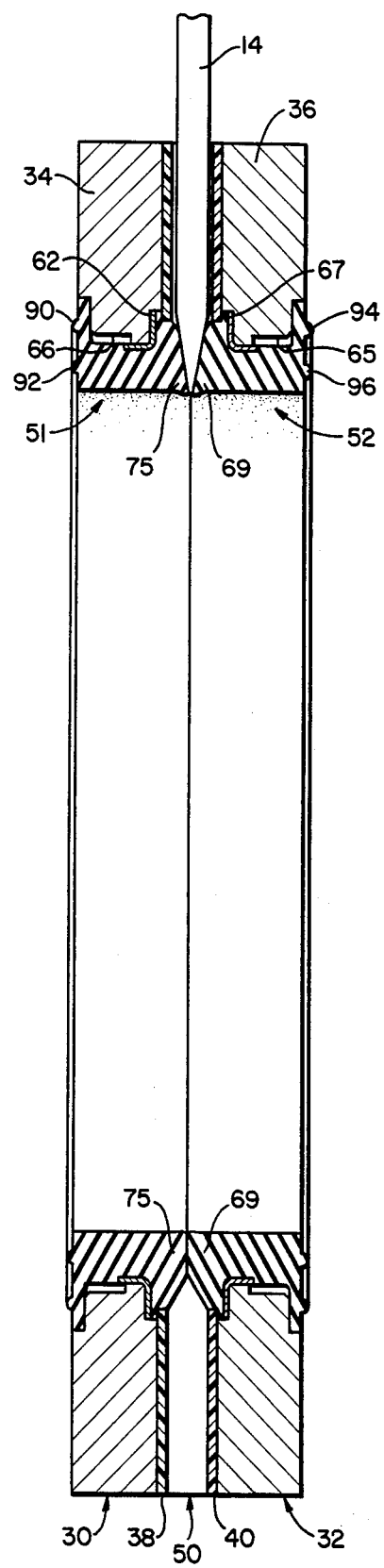

4,688,597

GATE VALVE

BACKGROUND AND SUMMARY OF THE INVENTION

The present invention relates to packingless gate valves and more particularly to knife gate valves having a specific construction of internal components including an elastomer sleeve and a stiffener ring which result in improved operation in sealing of the gate. The valve of the present invention may be used for any of various fluid control operations.

The gate valve of the present invention is an improvement of the gate valves as described in previous Clarkson patents, including U.S. Pat. Nos. 3,945,604; 4,007,911; and 4,257,447.

The present invention provides an improved construction as compared to the gate values of the previous patents by a special arrangement of the sleeve structure and stiffener ring at opposite sides of the gate having novel coaction with the gate and mounted in a novel manner in the valve housing.

Accordingly, it is an object of the present invention to provide a novel gate valve assembly wherein resilient sleeve units at opposite sides of the gate are mounted in a special manner in the valve housing and have special coaction with the relatively slidable gate.

A further object of the invention is to provide a novel gate valve assembly wherein the inner ends of axially compressed sleeve units engage opposite sides of the gate in the valve closed condition and sealingly engage in the valve opening condition, and are of special structure providing improved coaction between the sleeve units and the gate.

Another object of the invention is to provide a novel gate valve assembly wherein each sleeve end at the gate is of a specific configuration and with a stiffener of novel construction and location being provided to maintain the sleeve in position when the gate is opening or closing.

Another object of the invention is to provide a novel gate valve assembly wherein opposed sleeve units under axial compression are coaxially mounted in a novel manner in a valve housing.

Further objects of the invention will be apparent from the following description as taken with the appended claims and the accompanying drawings.

BRIEF DESCRIPTION OF THE DRAWINGS

FIG. 1 is an end elevation showing a gate valve assembly according to the present invention.

FIG. 2 is a side elevation of the gate valve assembly of the present invention showing the valve as installed on a section of pipe.

FIG. 5 is an enlarged fragmentary view mainly in section showing the valve components in fully open condition and inserted in a pipeline with the opposed seal sleeves in end abutment.

FIGS. 6, 7 and 8 are sections similar to FIG. 5 showing the valve in various stages at the starting, partly closed and fully closed condition respectively.

DESCRIPTION OF THE PREFERRED EMBODIMENTS

Figure 3:
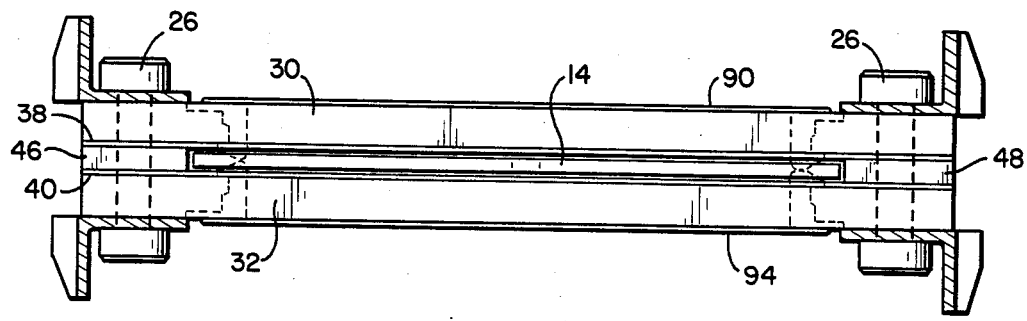
FIG. 3 is a plan view of the gate valve taken along line 3—3 of FIG. 1.

In the illustrated embodiment of the invention as shown in FIGS. 1 through 8, there is provided a valve assembly 10 which includes a housing 11 adapted to be inserted coaxially into a pipeline, and a gate actuator 12 mounted on the housing.

The movable valve element is in the form of a flat smooth imperforate gate plate 14 of uniform thickness mounted for reciprocal movement in and out of the fluid flow path through the housing. The gate 14 is shown in two positions, the open and closed positions, in FIG. 1. The actuator 12 is preferably a pneumatic or hydraulic cylinder 16 containing a piston rod 18 provided at the lower end with a bifurcated fitting 20 pivotally connected to a pin 22 on the upper end of the gate 14. Upon selective admission of fluid under pressure to the cylinder chambers at opposite sides of the piston in cylinder 16, the gate 14 may be moved between the pipeline open position of FIG. 5 and the closed position of FIG. 8 to be described in more detail hereinafter. The actuator 12 may also be a handwheel or an electric motor drive which rotates a threaded nut through which a screw stem passes, providing the required linear movement when attached to the gate 14.

Further description of the actuator and its function are not necessary to an understanding of the invention which relates essentially to the valve structure within the housing and its cooperation with the gate 14. The actuator may be mounted on the housing by a rigid open-ended frame 24 fixed at its lower end on the housing by means such as bolts 26 which as will appear may be two of the bolts holding the housing halves together.

Housing 11 includes opposed similar halves 30 and 32 having respective housing plates 34 and 36 each with adjacent face plate 38, 40. The housing halves are rigidly secured together as by a series of bolts 26 extending through the adjacent housing plates. The face plates 38, 40 abut flush upon the opposite sides of two flat uniform thickness spacer strips 46 and 48, as shown in FIG. 3, which are disposed between the housing halves at opposite sides to maintain between them a narrow space of sufficient width to pass gate 14 during operation of the valve. In this respect, the housing is similar to that of the above mentioned U.S. Pat. No. 4,257,447 which is incorporated by reference and to which reference is made for further detail. This gate passage or chamber space dimension is indicated at 50 in FIGS. 5 through 8 and it is of a fixed width slightly greater than the width of gate 14 when the bolt assemblies 26 are drawn tight. The housing halves are preferably flame cut steel plates or similar construction.

The face plates 38, 40 are preferably of non-metallic material such as U.H.M.W. polyethylene or other polymeric material which provides a non-stick surface so that slurry forced out of the valve due to movement of the gate 14 will not bridge and stick to the metal surface of the housing plates 34, 36.

Sealing sleeve units 51 and 52 are mounted in the respective housing halves. Sleeve unit 51 comprises an annular resilient body 54 of an elastomeric material such as natural rubber or other suitable elastomer such as polyurethane and is of substantially uniform radial cross section at its inner end 56. On the radially outer surface of sleeve mid-body portion 60, the sleeve 51 is reinforced by an annular shaped stiffener ring in the form of an annular strip or band 62 bonded securely thereto around a portion of its outer periphery. Where ring 62 is of thin metal, such as steel, it is vulcanized to the rubber body. Preferably ring 62 is of stainless steel to be rustproof. In some instances ring 62 may be of hard polyurethane or equivalent plastic. The outer diameter of ring 62 is cylindrical and an effective continuation of the adjacent cylindrical outer surface of body 54 and it has a smooth fit within machined surface 64 so that sleeve unit 51 is accurately coaxially mounted in the assembly. It will be noted that space 66 surrounds sleeve body 54 and extends between the housing half 30 and the radially outer part of sleeve body 54 when the sleeve is mounted in housing half 30.

Sleeve body 54 has two thin integral radial flanges 68, 70 with one flange 68 being located adjacent the face plate 38 and the stiffener ring 62 and with the other being an integral radial flange 70 formed on the axially outer end of the body 54 of the sleeve. Sealing beads 90, 92 are provided circumferentially around the sleeve body 54 on the axially outer end surfaces of body 54 and flange 70 to provide a tighter seal against the adjoining pipeline flange. As shown in FIGS. 4 through 8, a sealing bead 90 is positioned axially outwardly approximately midway along the length of the flange 70 and with sealing bead 92 being positioned radially inwardly of sealing bead 90 approximately midway along the radial width or thickness of sleeve body 54.

At its inner axial end ring 62 extends along the axially outer face of sleeve flange 68, then forms a right angle bend 72 and extends along the radially outer face of mid-body portion 60, terminating axially outwardly of the axially inner end of the recessed portion 66 located radially outwardly of the sleeve body 54 between the inner rib 76 of the housing plate 34 and flange 70. Rib 76 is an axially inner circular rib which provides a smooth cylindrical surface for engaging with stiffener ring 62.

Figure 4:
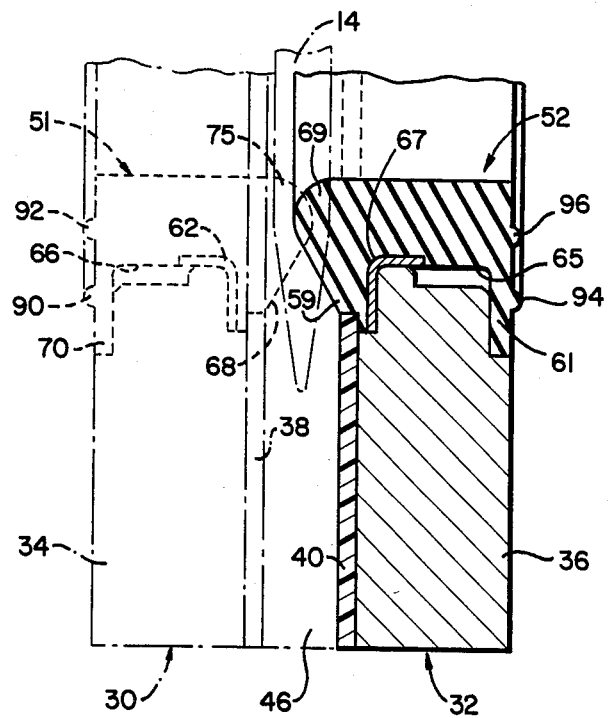
FIG. 4 is a partial elevation in cross section showing the valve components at the lower end of the assembly.

Flange 68 extends radially outwardly to provide a seat for the axial inner leg of ring 62 and also for the radial inner end of face plate 38. From its inner point of contact with face plate 38, the radially inward portion of sleeve body 54 is formed with an axially inwardly extending rounded end annular lip 75 disposed at the inner periphery of the sleeve 51. Lip 75 extends radially inwardly from the contact with face plate 38 so that the axially inner periphery of the lip 75 forms an angle such as about 30 degrees relative to the diameter of the sleeve body 51. This angle extends for approximately one-half the radial length of the lip 75, with the remainder of the lip 75 being of a generally rounded configuration, as shown in FIG. 4. Lip 75 when relaxed extends substantially farther axially inwardly than the vertical axis of the gate 14 as shown in FIG. 4. The lip 75 of sleeve unit 51 and the corresponding lip 69 of sleeve unit 52 will actually compress against each other or against the gate, but are shown in relaxed position in FIG. 4 and thus appear to overlap.

As shown in FIG. 5, sleeve 51 is also formed at its axially outer end with a thin integral radial flange 70 which fits into a recess in housing plate 34. When the parts are in assembly before introduction into a pipeline, flange 70 bulges slightly axially outwardly of housing plate 34 but when the valve assembly is in the pipeline sleeve flange 70 is compressed between housing plate 34 and the adjoining flange of the pipeline.

Sleeve unit 52 is similar to sleeve unit 51, having an annular resilient body 55 and carrying a bonded annular metal stiffener strip or ring 67 at its radially inner surface which ring extends along the axially outer face of sleeve flange 59, then forms a right angle bend and extends along the radially outer face of mid-body portion 63, terminating axially outwardly of the axially inner end of the recessed portion 65 located radially outwardly of the sleeve body 55 between the inner rib 57 of housing plate 36 and outer flange 61. Axially inwardly of ring 67 the resilient body 55 is formed with an axially inwardly extending rounded end lip 69 similar to lip 75. The sleeve body 55 for sleeve unit 52 is of similar cross sectional structure as sleeve unit 51 and has integral radial flanges 59, 61 which correspond to flanges 68, 70 of sleeve unit 51. Sleeve body 55 also has sealing beads 94, 96 which correspond to sealing beads 90, 92 of sleeve unit 51.

In practice, sleeve units 51 and 52 and the respective housing plates, face plates and stiffener rings may be identical and interchangeable, so that inventory may be held to a minimum.

When the sleeve units 51 and 52 are mounted within the housing, with the housing halves bolted together but not yet installed in a pipeline, the parts are positioned as shown in FIG. 5, so that sleeve end lips 69 and 75 are coaxially aligned and preferably in light compressive contact. The valve is open. At this time the distance from the intersection of lip 75 and face plate 38 to the intersection of lip 69 and face plate 40 is greater than the thickness of the gate plate 14.

The lower edge of the gate plate 14 is tapered to provide a relatively sharp straight knife edge as shown at 78, and initially may extend within space 80, as shown in FIG. 5, but not far enough to appreciably forcibly engage sleeve faces 86 and 88 of lips 69, 75. This is the normal valve open condition of the valve assembly operably mounted in a pipeline, wherein the gate has not yet effectively penetrated the sleeve seal.

In the assembly of the present gate valve, the sleeves 51, 52 are first installed on their respective housing plates 34, 36. The face plates 38, 40 are then placed on the respective housing plates 34, 36 and the spacers 46, 48 are installed on either side as shown in FIG. 3. The two housing halves are then bolted together in the open position relative to the gate 14, as shown in FIG. 5.

Figure 7:
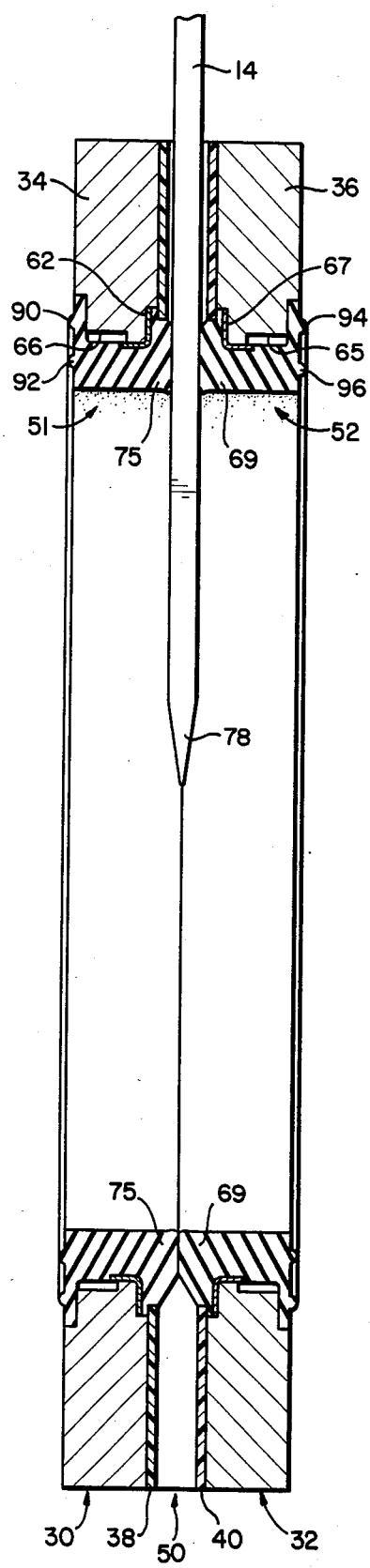
Figure 8:
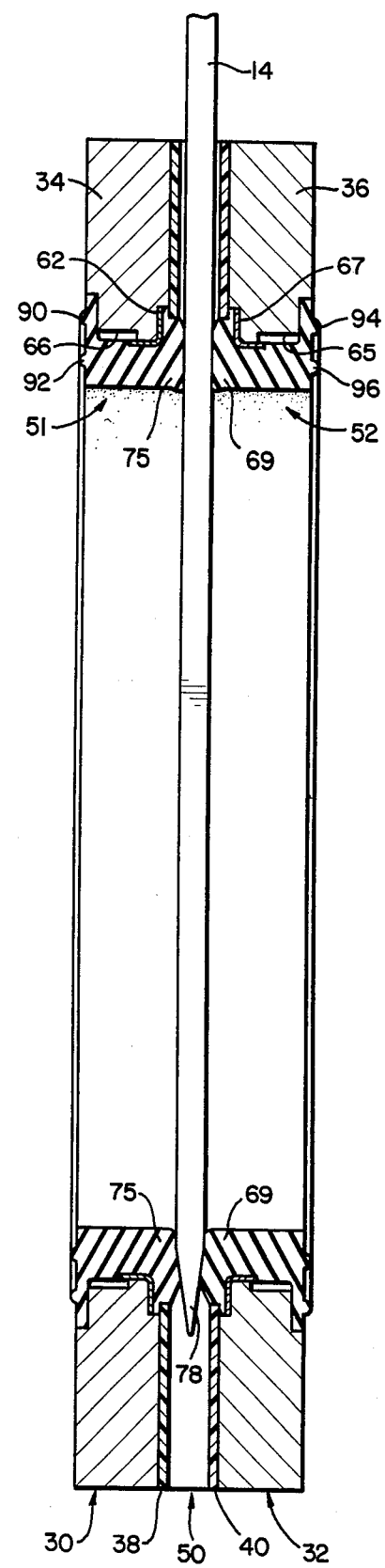

FIGS. 6 through 8 show in succession the coaction of the gate and sleeve seals as the valve undergoes a closing operation.

In FIG. 6 following downward displacement of the piston, the descending gate 14 lower edge enters and forces apart the upper sector of the sleeves 51, 52 as it is slidably disposed between sleeve end faces 86 and 88 and then forces apart the lips 69 and 75.

As the gate 14 moves down, each of the stiffener rings, due to the ring positions being relatively surrounded by the compressible sleeve material, functions somewhat as a fulcrum to relieve some of the sealing compression between lips 69 and 75 so that the tapered lower knife edge of the plate may more easily separate the lips. In so doing, the sleeves move into the space surrounding the gate and this action pulls the sleeve material back from the area of the lips 69, 75. This in turn reduces friction between the downwardly moving gate, which is slidably guided between sleeve end faces 86 and 88, and the opposing lips. Excess sleeve material may also displace into recesses 65,66. By such overall action, the metal stiffener rings thereby provide for good smooth reduced friction sliding contact between the sleeves 51, 52 and the gate 14.

It has been found that the particular configuration and position of the stiffener rings 62, 67 results in two primary advantages: (1) the rings prevent the pliable sleeve material from following the gate 14 as it penetrates between the lips 69, 75. Without the rings 62, 67 the sleeves tend to grip the gate and follow it into the closed position; and (2) the axially extending portion of the stiffener rings helps to align the sleeves with the housing plates, thus making each sleeve and housing plate concentric and also serving to align the two sleeves with each other, thus providing for a smooth gate closing and opening action. Also the metal to metal contact between each stiffener ring and the respective housing plate provides a reinforced structure which results in smoother gate operation.

As the gate 14 penetrates further toward the closed position, the seal between lips 69 and 75 is progressively parted while the relatively soft sleeve material effectively flows around the knife edge. The combination of the knife edge and the gate and the soft compressible material of the sleeve lips minimize leakage from the valve during gate closing and opening operations. In this regard, a most important advantage of the gate valve construction of the present invention is that there is no leakage to the outside when the valve is fully open and no leakage to the outside or past the gate internally when the valve is fully closed.

FIG. 8 shows the gate in final closed valve position. By this time the knife edge has passed the lower sector of the seal lips 69 and 75 and the gate is disposed between them, while the knife edge projects into the space below. At this time the opposed flat smooth side surfaces of the gate plate 14 are uniformly engaged under compression by the compressed seal lips, which may even be substantially flattened as shown, so that there is a complete annular seal of good radial extent within the valve. At this time the seal lips are in uniform maximum compression and the internal pressure of the fluid or slurry in the pipeline will further force the upstream sleeve lips into engagement with the gate 14, so that there is no leakage in the valve closed position, this action being aided by the inner surface portion of the sleeve.

In the gate closed condition, the area of the gate 14 that is unsupported is minimized by the present invention so that a maximum pressure rating for the valve can be obtained. In this regard, a critical dimension is the diameter of the stiffener rings as measured at the radially outermost point of the rings.

During movement of the gate 14 from the closed position of FIG. 8 to the open position of FIG. 5, substantially the reverse of the above described procedure takes place, the resiliency of the seal material maintaining sealing sliding contact between the lips 69, 75 and the gate 14 until the gate 14 is withdrawn from between the lips.

The valve of the invention is a two-way valve, that is it may control flow in either direction in the pipeline and may be reversed end for end. The sleeve units 51 and 52 are essentially identical so that either may be reversed and function as described above in the assembly. The individual sleeve units are readily removed and replaced when damaged or worn.

The invention may be embodied in other specific forms without departing from the spirit or essential characteristics thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by Letters Patent is:

1. A gate valve assembly comprising two body housing members having coaxial through passages and being secured together in end to end relation, each of said passages being defined by a housing plate, with means to define a relatively narrow transverse gate chamber, in which an imperforate gate is slidable between a valve open position in which the gate does not block fluid flow through the passages, and a closed position in which the gate is interposed between the passages, a unitary annular sealing sleeve unit lining each of said passages and extending the entire length of each passage whereby each sleeve unit has an inner end extending into the chamber and an outer end at a passage end remote from the chamber, and with each sleeve unit having a mid-body portion between said inner end and said outer end, with each of the sleeve units extending into the chamber in the form of annular resilient lips adapted to sealingly engage each other under compression in the open position of the valve, but with the gate between the lips when the valve is closed, each of said sleeve inner and outer axial ends having a flange extending radially outwardly therefrom; said flanges engaging inner and outer side wall surfaces of a respective housing plate, each of the sleeve units being in the form of an axially compressible annular body of elastomeric material which is uniformly resilient throughout its volume without a separate internal reinforcing member, and with an encircling thin stiffening ring of harder material bonded to the axially outer surface of the flange on the inner end of each sleeve and being adjacent said housing plate, each stiffening ring being shaped with a right angle bend so as to have an axially outwardly extending portion which is bonded to and extends along the radially outer face of the mid-body portion of said sleeve, thus providing both axially and radially facing surfaces for each sleeve body between said sleeve body and said housing plate.

2. The gate valve assembly of claim 1 wherein a recessed portion is provided between each sleeve body and the respective housing plate, said recessed portion extending axially from a position axially inwardly of the axially outer end of said stiffening ring to said flange on the outer axial end of each sleeve body.

3. The gate valve assembly of claim 2 wherein said housing plate has a raised axially inner rib which extends radially inwardly of the remainder of said housing plate and abuts said stiffening ring, said rib serving to define the axial inner end of said recessed portion.

4. The gate valve assembly of claim 1 wherein a face plate is mounted axially inwardly of each housing plate between each housing plate and said gate.

5. The gate valve assembly of claim 4 wherein each face plate is formed of a polymeric non-stick material.

6. The gate valve assembly of claim 1 wherein each sleeve unit is provided with at least one sealing bead extending circumferentially around the axially outer end of each sleeve unit.

7. The gate valve assembly of claim 6 wherein a pair of sealing beads are employed, a first sealing bead being located axially outwardly of the axially outer flange of each sleeve and with a second sealing bead being located radially inwardly of said first sealing bead.

8. The gate valve assembly of claim 7 wherein said first sealing bead is positioned approximately midway along the length of said axially outer flange and wherein said second sealing bead is positioned radially inwardly of said first sealing bead approximately midway along the radial width or thickness of said sleeve body.

9. The gate valve assembly of claim 1 wherein said stiffening rings are formed of stainless steel.

10. The gate valve assembly of claim 1 wherein said stiffening rings are formed of hard polyurethane.

* * * * *